G. R. COMSTOCK.
Meat-Tenderer.
No. 166,189.　　　　　　　　　　　　Patented Aug. 3, 1875.
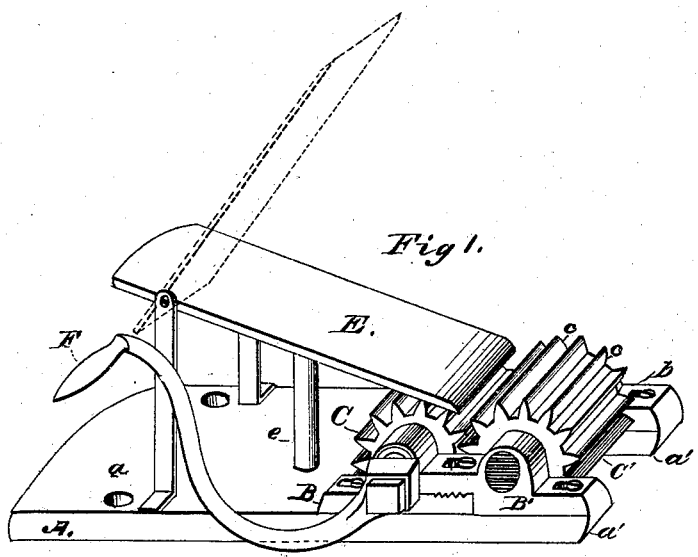
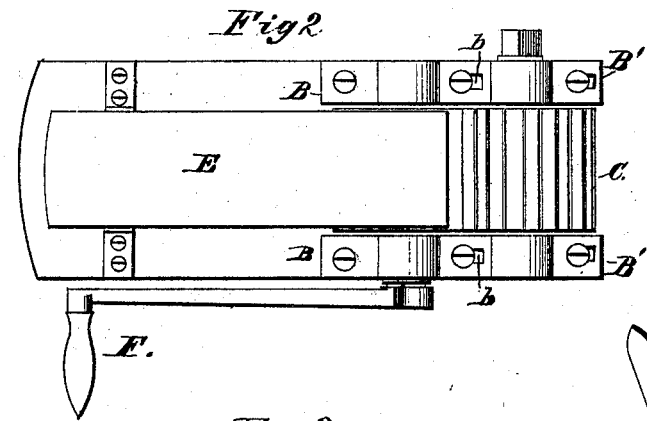
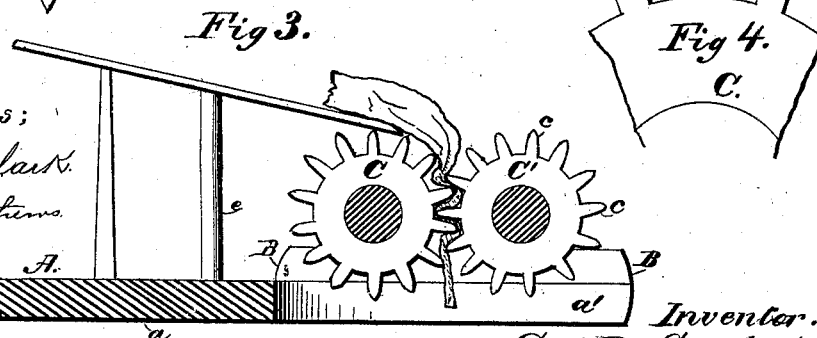
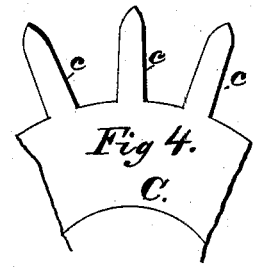

UNITED STATES PATENT OFFICE.

GEORGE R. COMSTOCK, OF MANKATO, MINNESOTA.

IMPROVEMENT IN MEAT-TENDERERS.

Specification forming part of Letters Patent No. 166,189, dated August 3, 1875; application filed June 10, 1874.

*To all whom it may concern:*

Be it known that I, GEORGE R. COMSTOCK, of Mankato, in the county of Blue Earth and State of Minnesota, have invented a new and useful Improvement in Meat-Tenderers; and I do hereby declare that the following is a full and exact description of the same, reference being had to the accompanying drawings, and to the letters of reference marked thereon.

This invention is adapted, by means of the peculiar construction of its teeth, to tear apart the fibers of the meat without cutting them or causing them to adhere thereto. It is also adapted, by the arrangement of its parts, to be easily, quickly, and thoroughly cleansed after using; and its novelty consists, mainly, in the combination of certain adjustable bearing-blocks with the wheels for tearing apart the fiber of the meat.

In the drawings, Figure 1 represents a perspective view of my invention; Fig. 2, a plan view; Fig. 3, a sectional elevation; and Fig. 4, an enlarged view of the teeth for tearing the fibers.

To enable others skilled in the art to make and use my invention, I will now proceed to describe fully its construction and manner of operation.

A represents the base-board of the machine, provided with a solid portion, *a*, adapted to be secured to the edge of a table, or to some other suitable place, and with the arms *a' a'* adapted to support the operative parts, and to furnish an intermediate space to permit the discharge of the meat from the wheels, as shown. B B represent bearing-blocks rigidly attached to the arms *a' a'* of the base-board upon each side of the central opening, and provided with suitable journals for the shaft of the wheel C. B' B' represent corresponding bearing-blocks, supporting the wheel C', and similarly located upon the base-board, adjacent to the blocks B B; but these are adapted for longitudinal adjustment by means of slots *b b* and proper securing-screws, as shown. By means of this adjustment the distance between the wheels C C' is regulated. To make the adjustment exactly the same on each side, the ends of the blocks B' B' adjacent to the blocks B B are caused to overhang the last-named blocks, as shown, and the contiguous bearing-faces are provided with a series of corresponding serrations, as shown in Fig. 1, so that in adjusting the distance between the wheels the loose blocks are moved a certain fixed and definite distance, either the distance of one tooth or more, as may be desired. C C' represent the wheels, of identical construction, each of which consists of a cylinder projecting some distance above its shaft, and provided upon its periphery with peculiar-shaped teeth *c c*, as shown. These are each provided with two long sides, slightly inclined toward each other from the base upward, and united by a semi-oval top. The recesses between these teeth resemble, in cross-sections, the frustum of a cone. By means of the narrow elongated form given to the teeth they are adapted, in acting upon the meat, to tear the fibers apart, and not in any degree to cut the same, the action being analogous to that of a plunger and die, as the meat is held by certain of the teeth while its fibers are torn by the action of the others. E represents an inclined board, adapted to deliver the meat properly to the wheels. It is pivoted near its rear end between proper standards, and is supported in front by the post *e*, as shown. By means of this construction the board may be readily turned out of the way when it is desired to clean the wheels, but is securely held in place, when in use, by its own gravity. F represents the crank, which is adapted to be attached to the shaft of either wheel, as shown, so that the machine may be operated upon either side.

From the foregoing description the operation will be readily understood.

Some of the advantages of the described construction over existing machines are as follows:

A large class of existing machines are provided with points and jagged edges, which operate, it is true, to some extent to tear and separate the fibers, but are exceedingly defective, because it is found almost impossible to separate the meat from the machine without leaving adhering particles, which cannot be entirely removed without great labor, and unless removed become decomposed and make the machine unfit for use.

Another class is provided with yielding springs, by which means the machine is adapted to act on all the meat excepting those hard and tough portions which need it the most.

The described machine avoids all these various defects. It can be most easily and thoroughly cleansed, as the meat does not adhere to the wheels, which have plane surfaces projecting above the frame-work, so that they can be cleansed without removing them from the machine.

The fibers of the meat are separated by the action of the wheels, and as the parts are unyielding the tough portions are acted on as well as the tender portions.

These machines may be made of any proper size; but I preferably make them from six to fifteen inches in length, with the wheels from two to four inches in diameter.

Having thus fully described my invention, what I claim as new, and desire to secure by Letters Patent, is—

The combination of the adjustable bearing-blocks and the wheels C C', the blocks being adapted for adjustment at fixed distances, but rigidly holding the wheels in any position in which they may be secured, as described.

This specification signed and witnessed this 3d day of June, 1874.

GEORGE R. COMSTOCK.

Witnesses:
  A. NEUMAYER,
  W. B. TORREY.